United States Patent [19]

Yoshida et al.

[11] Patent Number: 4,471,736
[45] Date of Patent: Sep. 18, 1984

[54] IGNITION TIMING CONTROL SYSTEM

[75] Inventors: Matsujyu Yoshida, Bisai; Nobuyuki Inoue, Kariya; Hideo Miyagi, Okazaki; Toshio Suematsu; Akihiko Kido, both of Toyota, all of Japan

[73] Assignees: Nippondenso Co., Ltd., Kariya; Toyota Jidosha Kogyo Kabushiki Kaisha, Toyota, both of Japan

[21] Appl. No.: 352,456

[22] Filed: Feb. 25, 1982

[30] Foreign Application Priority Data

Feb. 26, 1981 [JP] Japan .................................. 56-27508

[51] Int. Cl.$^3$ .............................. F02P 5/04; F02P 5/14
[52] U.S. Cl. ..................................... 123/425; 123/419; 123/421
[58] Field of Search ............... 123/425, 419, 421, 422, 123/423, 416, 417; 364/431.08

[56] References Cited

U.S. PATENT DOCUMENTS

| | | | |
|---|---|---|---|
| 4,265,205 | 5/1981 | Garcea | 123/425 |
| 4,265,206 | 5/1981 | Garcea | 123/425 |
| 4,275,692 | 6/1981 | Takeda et al. | 123/425 |
| 4,282,841 | 8/1981 | Takagi et al. | 123/425 |
| 4,304,203 | 12/1981 | Garcea et al. | 123/425 |
| 4,331,117 | 5/1982 | Ginsburgh | 123/425 |
| 4,345,558 | 8/1982 | Yamaguchi et al. | 123/425 |
| 4,357,919 | 11/1982 | Hattori et al. | 123/425 |
| 4,367,531 | 1/1983 | Furuhoshi et al. | 123/425 |
| 4,370,964 | 2/1983 | Muranaka et al. | 123/425 |
| 4,377,999 | 3/1983 | Komurusaki et al. | 123/425 |

Primary Examiner—Raymond A. Nelli
Attorney, Agent, or Firm—Cushman, Darby & Cushman

[57] ABSTRACT

An ignition timing control system for an internal combustion engine having a plurality of cylinders in which at each of different load conditions determined by the operating conditions of the engine the ignition timing for each cylinder is periodically retarded to cause a nonknocking ignition and the resulting background vibration levels detected by a knock sensor are stored in a memory. During the normal operation, the vibration level detected by the knock sensor with respect to each cylinder is compared with the corresponding background vibration level stored under the same load condition to detect the presence of knocking and thereby to determine the proper ignition timing.

11 Claims, 9 Drawing Figures

IGNITION TIMING CONTROL SYSTEM

BACKGROUND OF THE INVENTION

The present invention relates to systems for controlling the ignition timing of internal combustion engines and more particularly to an ignition timing control system which employs a knock sensor to detect the occurrence of knocking in an engine and thereby to control the ignition timing of the engine properly.

In recent years, a variety of knock sensors and ignition timing control systems employing such knock sensor have been proposed (e.g., U.S. Pat. No. 4,002,155) and even with these sensors and control systems it has been difficult to accurately detect the occurrence of knock and properly control the ignition timing of an engine throughout the range of the engine load conditions. For instance, in the case of a known ignition timing control system in which the occurrence of knocking is detected in accordance with the vibration level from a knock sensor mounted on the engine body, the sensor's vibration level itself varies with the operating condition of the engine and thus in accordance with the decision made only on the basis of the vibration level from the knock sensor it is difficult to properly detect the occurrence of knock in each of the cylinders under all the load conditions of the engine.

SUMMARY OF THE INVENTION

With a view to overcoming the foregoing deficiencies in the prior art, it is the primary object of the present invention to provide an ignition timing control system for internal combustion engines which is designed so that the ignition is effected in each cylinder of an engine in such a manner that the occurrence of knocking is absolutely prevented for a fixed time during the period of controlled ignition timing and the output vibration level of a knock sensor corresponding to the nonknocking ignition is stored for each cylinder under each of all the load conditions of the engine (the vibration level is a structurally inherent vibration level corresponding to each load condition and is referred to as a background vibration level), whereby during the normal ignition timing control period the vibration level from the knock sensor is compared with the corresponding nonknocking background vibration level, thereby ensuring accurate detection of the occurrence of knocking and proper control of the ignition timing for each of the cylinders under all the load conditions of the engine.

DESCRIPTION OF THE PREFERRED EMBODIMENT

The present invention will now be described in greater detail with reference to the illustrated embodiment.

Figure 1:
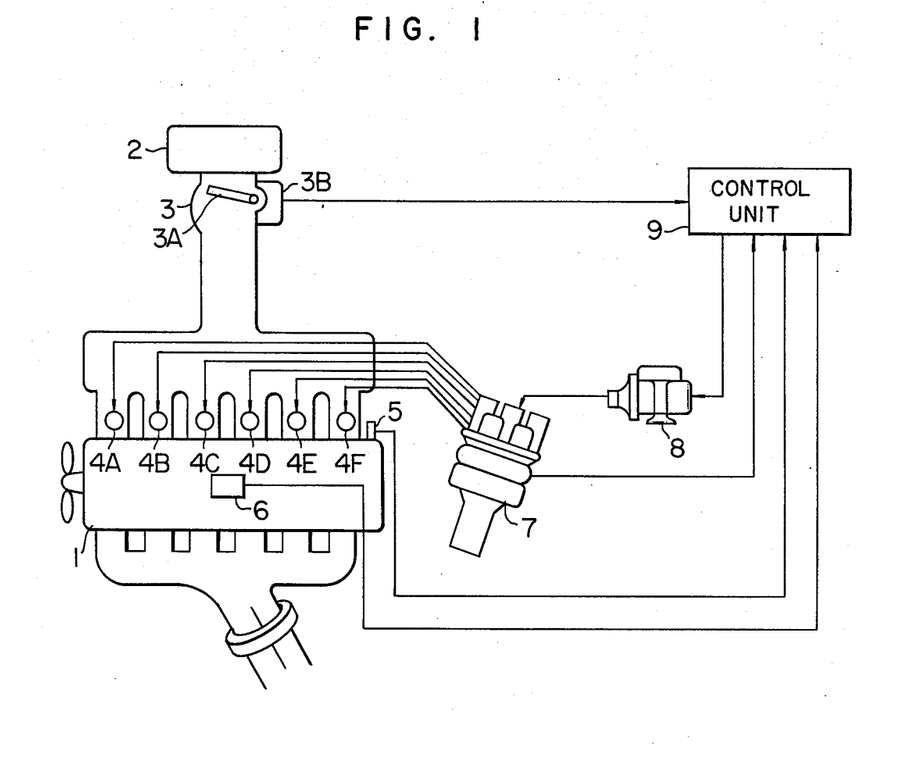
FIG. 1 is a schematic diagram showning the construction of an internal combustion engine incorporating an ignition timing control system according to the invention.

Referring to FIG. 1, there is illustrated a block diagram showing by way of example the construction of an internal combustion engine to which the invention is applied. In the Figure, numeral 1 designates a four-cycle spark-ignited six-cylinder engine which is installed in an automobile, 2 an air cleaner, and 3 an air flow sensor of a known type comprising a measuring plate 3A, a potentiometer 3B, etc., for measuring the flow rate and temperature of the air drawn in by the engine 1. Numerals 4A, 4B, 4C, 4D, 4E and 4F designate spark plugs which are mounted in the respective cylinders of the engine 1. Numeral 5 designates a water temperature sensor comprising a temperature sensitive element such as a thermistor for obtaining an information indicative of the cooling water temperature of the engine 1. Numeral 6 designates a knock sensor comprising a piezoelectric device or the like for detecting the level of vibrations in the engine 1 when the ignition is effected by each of the spark plugs. Numeral 7 designates a distributor which distributes the required spark ignition energy to each of the spark plugs 4A to 4F and which also serves by means of its built-in rotational angle sensor the function of detecting the rotational speed and the crankshaft angle and cylinder data of the engine 1. For purposes of the description to follow, the distributor 7 is referred to as an engine speed sensor. The engine speed sensor 7 generates as its output signals a signal N for each 30 degrees of crankshaft rotation and a signal G indicative of the cylinder group indication. Numeral 8 designates an ignition including a high-voltage ignition coil to serve the function of supplying each ignition high voltage to the distributor 7. Numeral 9 designates a control unit including a microcomputer which is responsive to the intake air flow and temperature data generated from the air flow sensor 3, the rotational speed and crank angle data of the engine 1 generated from the sensor 7, the cooling water temperature data from the water temperature sensor 5 and the knocking vibration discrimination data from the knock sensor 6 to serve the function of computing the proper ignition timing of the engine 1 and supplying an ignition signal to the ignition system 8.

Figures 2, 3:
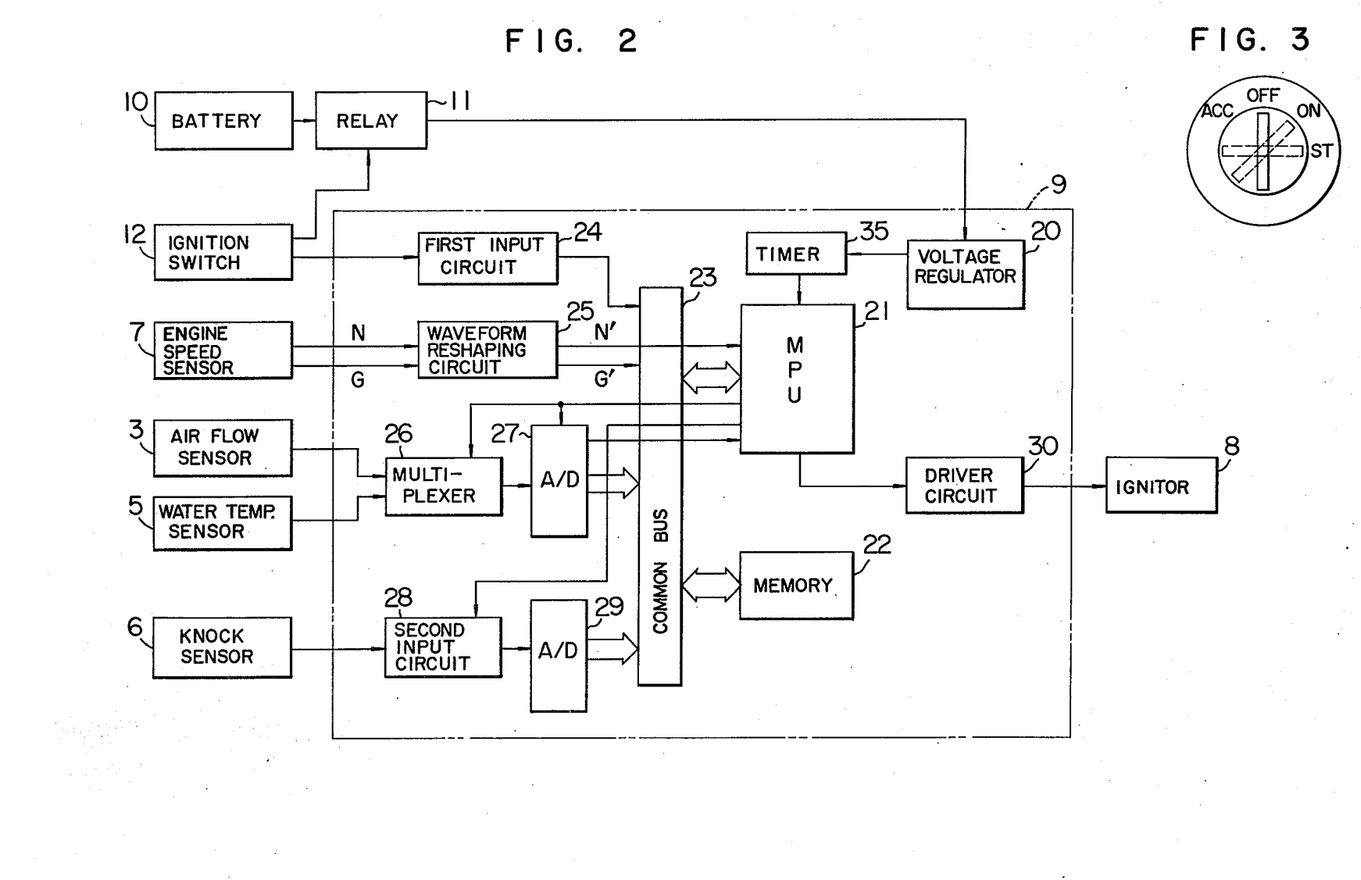
FIG. 2 is a block diagram showing the construction of the control unit shown in FIG. 1.
FIG. 3 shows a key switch for commanding an engine operating condition.

Referring now to FIG. 2, the individual blocks forming the control unit 9 will be described. A voltage regulator 20 regulates or maintains constant the output voltage of an automobile battery 10 applied via a relay 11 and it supplies the required voltage to the individual circuits. The relay 11 is turned on and off by an ignition switch 12 (hereinafter referred to as an IG switch), that is, the relay 11 is turned on when the IG switch 12 is moved to its ON position or ST position and the relay 11 is turned off when the IG switch 12 is moved to any other position. The IG switch 12 is an ordinary automobile key switch so that the engine 1 is stopped when the IG switch 12 is in the OFF position shown in FIG. 3 and the electric units of the engine 1 come into operation when the IG switch 12 is moved to the ON position. When the IG switch 12 is moved to the ST position, the starter motor (not shown) of the engine 1 is operated to crank the engine 1.

A microprocessor 21 (hereinafter referred to as an MPU) is designed to supply command signals to the individual circuits in accordance with a predetermined program and the MPU 21 itself incorporates a timer and an output circuit for generating an ignition signal. More specifically, the microprocessor 12 comprises a microcomputer equivalent to the 12-bit microcomputer T3640 manufactured by Tokyo Shibaura Electric Company, Ltd.

Memory means 22 is a program storage device and it comprises a random-access memory RAM and a read-only memory ROM. The transmission of data between the memory device 22 and the MPU 21 is effected by way of a common bus 23. A first input circuit 24 is operated by the IG switch 12 so that data indicative of whether the IG switch 12 is in the ST (start) position is supplied to the MPU 21 via the common bus 23. A waveform reshaping circuit 25 reshapes the waveforms of the signals generated from the rotational speed sensor 7 in synchronism with the rotation of the engine 1 and supplies them to the MPU 21. More specifically, in this embodiment the rotational speed sensor 7 generates two kinds of signals including a signal indicative of the No. 1 cylinder of the engine shown in FIG. 1 (hereinafter referred to as a G signal) and signals indicative of the crankshaft positions of 0°, 30°, 60°, 90° . . . (hereinafter referred to as N signals) so that the resulting reshaped G' signal is supplied to the MPU 21 via the common bus 23 and the reshaped N' signals are used as interruption request signals to the MPU 21. In accordance with the N' signals derived from the rotational speed sensor 7 the MPU 21 performs an interruption processing at intervals of 30° crank angle of the engine 1 so that during each interruption processing effected every 30° crank angle, the crank-angle positions of the respective cylinders and the rotational speed of the engine 1 can be grasped accurately in accordance with the G signal data received via the common bus 23.

An analog multiplexer 26 is responsive to control signals from the MPU 21 to select the intake air flow data from the intake air sensor 3 and the cooling water temperature data from the water temperature sensor 5 and supply the same to a first analog/digital (A/D) converter 27. The first A/D converter 27 converts the input analog values to binary coded digital data and these data are also introduced into the MPU 21 via the common bus 23. A second input circuit 28 is responsive to a control signal from the MPU 21 so that the vibration waveform from the knock sensor 6 is received for a predetermined period immediately following the delivery of each ignition signal from the ignition system 8 to the engine 1 and thus the peak of the vibration waveform generated from the knock sensor 6 during the explosion stroke is held in analog quantity, thereby making possible the detection of the intensity of knock upon occurrence thereof and the detection of the presence of knock.

A second analog/digital (A/D) converter 29 converts the vibration level from the knock sensor 6 subjected to the peak holding by the input circuit 28 to a binary coded digital data and this data is also introduced into the MPU 21 via the common bus 23.

Utilizing the data from the air flow sensor 3 and the rotational speed data detected by the rotational speed sensor 7 as basic data and the cooling water temperature data from the water temperature sensor 5 and the knocking data from the knock sensor 6 as correction data, the MPU 21 computes an ignition advance angle in accordance with the contents of the preliminarily programmed memory device 22 and applies an ignition signal to a driver circuit 30.

The driver circuit 30 amplifies the ignition signal generated from the MPU 21 and supplies it to the ignition system 8.

Figure 4A:
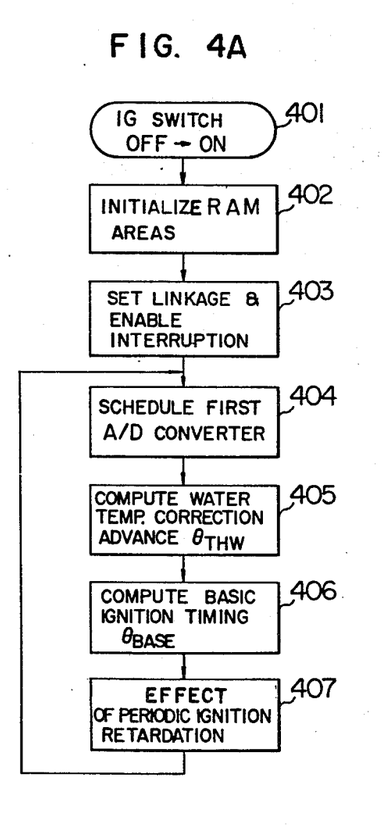
FIG. 4A is a flow chart showing an operation program of the control unit of FIG. 2 which is a main routine for instructing the execution of periodic ignition timing retardation for background vibration level detecting purposes in response to various input data in accordance with the invention.
Figure 4B:
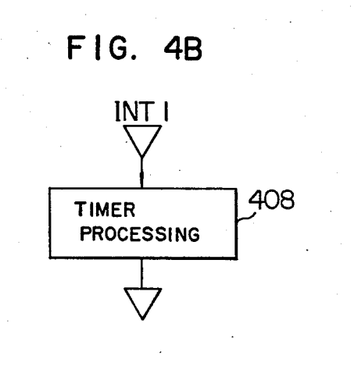
FIG. 4B shows an interrupt subroutine $INT_1$ for setting various processing time periods.
Figure 4C:
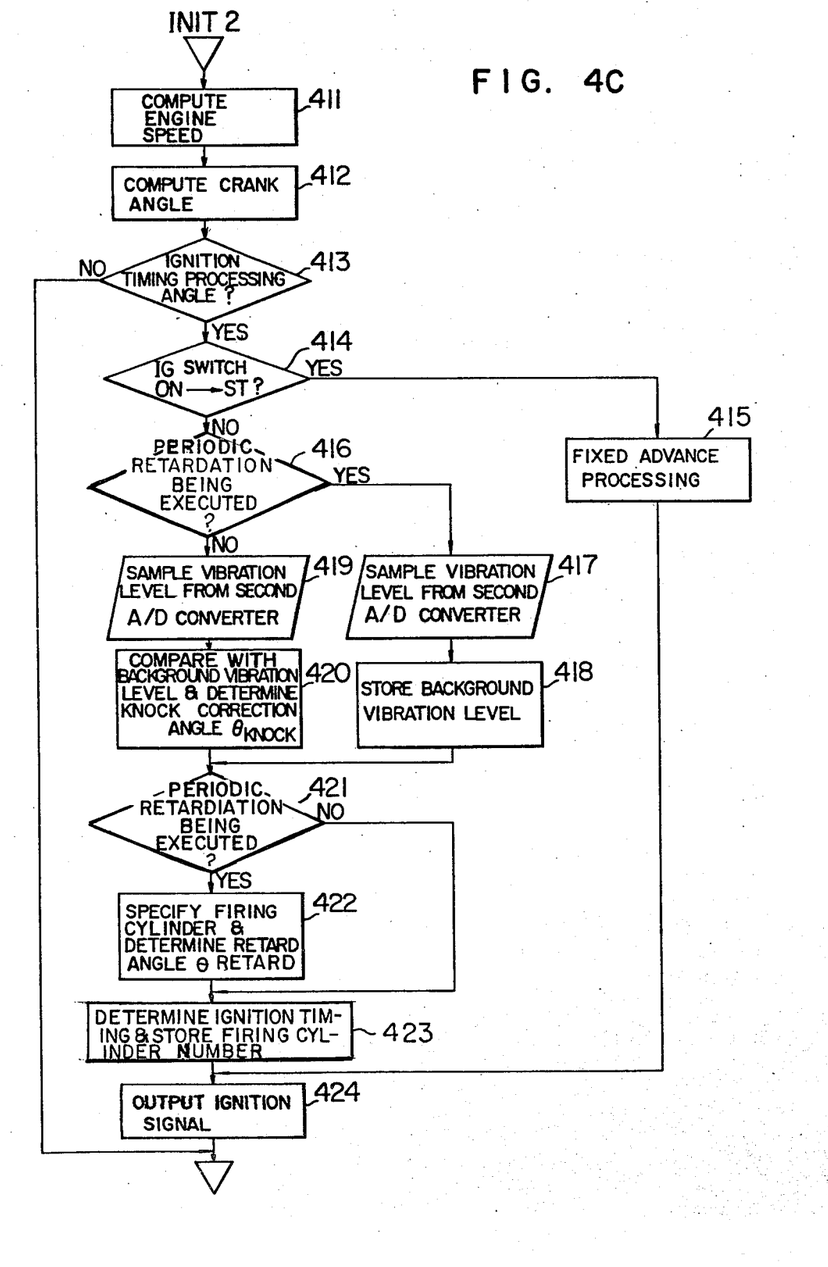
FIG. 4C shows an interrupt subroutine $INT_2$ for setting the time of ignition for each of the cylinders.
Figure 4D:
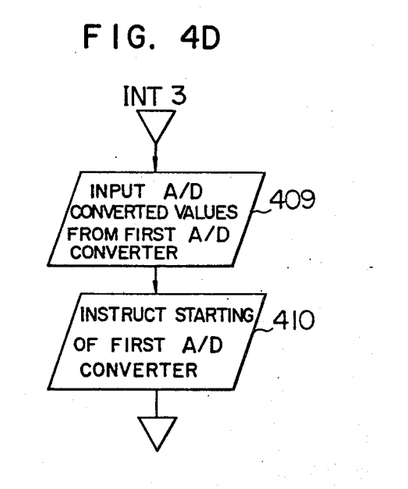
FIG. 4D shows an interrupt subroutine $INT_3$ for effecting the A/D conversion of input data.

FIGS. 4A to 4D show flow charts for the previously mentioned program. More specifically, FIG. 4A shows a main routine for computing a non-knocking retarded ignition timing in accordance with the correction angle determined by cooling water temperature data and the basic ignition timing determined by intake air flow data and rotational speed data, and FIG. 4B shows a subroutine $INT_1$ for setting interruption processing time intervals. FIG. 4C shows a subroutine $INT_2$ for performing the ignition processing for each cylinder in accordance with the background and knocking vibration levels, and FIG. 4D shows a subroutine $INT_3$ for subjecting the water temperature and intake air data to A/D conversion. The ignition angle computing control operation of the control unit shown in FIG. 2 will now be described with reference to these flow charts. When the IG switch 12 is changed from the OFF to the ON position, the output voltage of the battery 10 is applied via the relay 11 to the voltage regulator circuit 20 of the control unit 9 and thus the voltage regulator circuit 20 supplies a predetermined voltage to the respective circuits of the control unit 9 including the MPU 21. At this time, the MPU 21 is brought into operation so that in accordance with the control program preset into the memory device 22, the MPU 21 applies commands to the respective circuits in the control unit 9. Of the processes performed by the MPU 21, the main routine will be described first.

When the MPU 21 is brought into operation by a stage 401, the RAM areas contained in the memory device 22 are initialized by a stage 402 and then a stage 403 establishes an interruption processing linkage (designation of the first address of the memory stored program) and effects an interrupt mask setting for inhibiting the interrupt processes during a predetermined period after the turning on of the IG switch 12, thereby enabling the processing of interrupts. After this time, the interruption processes are enabled or acceptable.

A stage 404 establishes a schedule of selecting one or the other of the intake air flow data from the air flow sensor 3 and the cooling water temperature data from the water temperature sensor 5. In other words, since the sampling of water temperature data and of air flow data are effected, for example, at intervals of several seconds and several msec, respectively, their selections are separately commanded in accordance with a timing predetermined by the timer.

A stage 405 computes a water temperature correction advance (hereinafter referred to as $\theta_{THW}$) on the basis of the cooling water temperature data from the water temperature sensor 5 and stores it. A stage 406 computes a basic ignition timing (hereinafter referred to as $\theta_{BASE}$) of the engine 1 for each cylinder in accordance with the intake air flow data from the air flow sensor 3 and the rotational speed data of the engine 1 from the engine speed sensor 7 and stores it.

A stage 407 periodically establishes, during the ignition control of the engine 1, a predetermined time interval of such a value which does not deteriorate the engine power performance and gives an instruction (or sets an execution instruction flag) to effect a periodic ignition retard during the time interval such that the basic ignition timing $\theta_{BASE}$ computed by the stage 406 is retarded to such an extent that the occurrence of knocking under the corresponding load condition is prevented positively. This allows interruption processing steps 417 and 418 which will be described later to sample and store the vibration levels from the knock sensor 6 corresponding to the absolutely nonknocking operation conditions.

Then, the MPU 21 returns to the stage 404 so that the above-mentioned processing is performed repeatedly under all the expected load conditions for each of the engine cylinders.

Next, the operation of the MPU 21 with respect to the respective interruption processes will be described. A subroutine INT$_1$ is an interruption process which is performed in response to the counting up of a hardware timer which is incorporated in the MPU 21, and is actuated by each of the timing pulses which are generated from a timer circuit 35 at intervals of 1 msec, for example, in response to the operation of the voltage regulator circuit 20. Control is returned to the main routine after the execution of a timer processing by a stage 408. In accordance with the result of the timer processing performed by the stage 408 or the timing indicated by the timer incorporated in the MPU 21, the scheduling of the first A/D converter 27 by the main routine stage 404 and the instructing of periodic ignition retardation by the stage 407 for each of the engine cylinders are performed. The MPU timer is utilized as basic time indicating means for determining the processing times of the stages 404 and 407. A subroutine INT$_3$ is an interruption process which is initiated upon the completion of the A/D conversion of the first A/D converter 27 (this is instructed by the direct coupling from the first A/D converter 27 to the MPU 21), and a stage 409 takes in and stores in the memory device 22 the data produced by the just completed A/D conversion. A stage 410 selects the operation of the analog multiplexer 26 in accordance with the schedule of the first A/D converter 27 which was processed by the main routine 404 and gives an A/D conversion execution command to the first A/D converter 27, thus returning the control to the main routine. As a result, after the stage 403 which makes the interruption processes acceptable, the stages 404 to 407 are repeated in a loop fashion and during the interval, the interruption processes of INT$_1$ and INT$_3$ are performed in accordance with the timing determined by the timer circuit 35 and the timer incorporated in the MPU 21.

On the other hand, a subroutine INT$_2$ which is an interruption process for determining the desired ignition timing is initiated for every 30° crankshaft rotation of the engine 1 by the rotational speed sensor 7 in the above-mentioned loop.

In the subroutine INT$_2$, a stage 411 computes the rotational speed of the engine 1 on the basis of the data from the engine speed sensor 7.

Figures 5, 6:
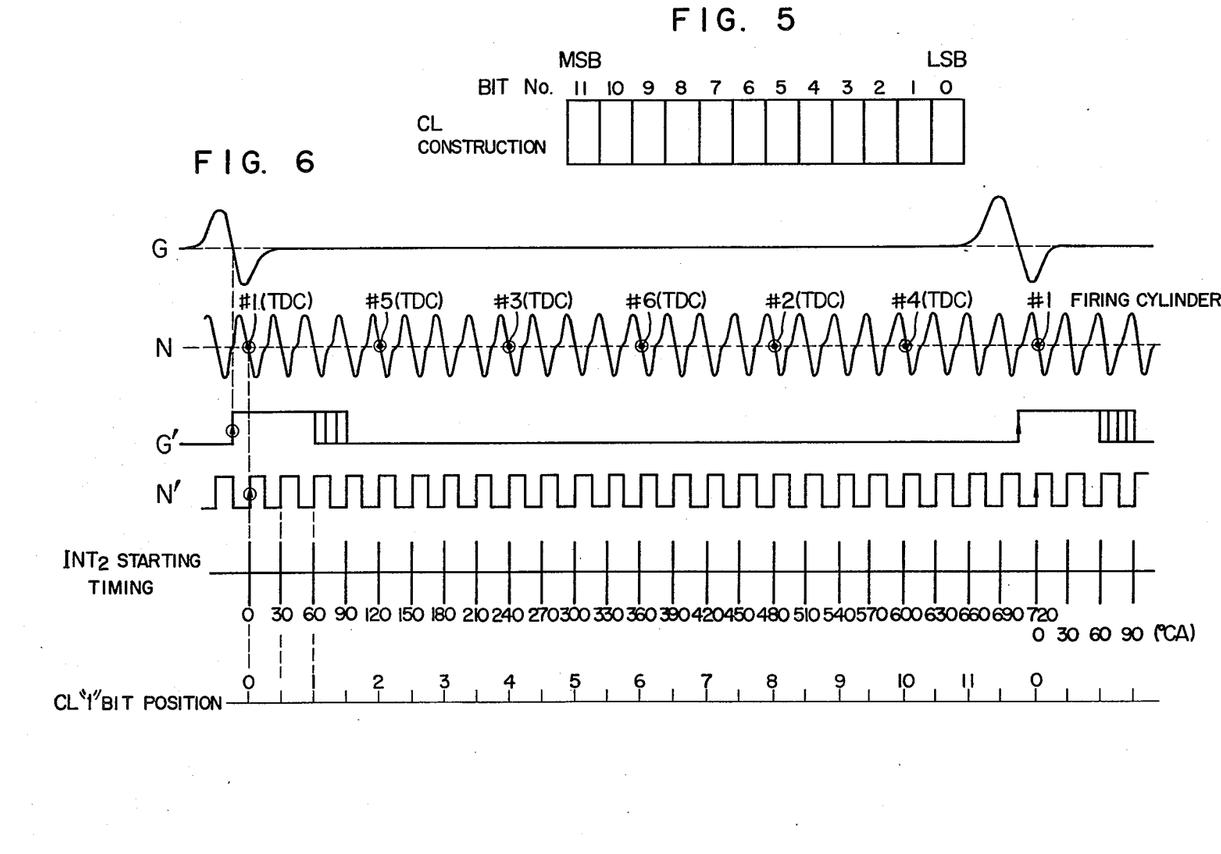
FIG. 5 shows the area in the memory RAM of FIG. 2 for storing engine crank angles.
FIG. 6 is a diagram showing the output signals of a rotational speed sensor which are indicative of the cylinder numbers and crank angles.

A stage 412 computes crank angles of the engine 1. An area for one word of 12 bits long is secured in the RAM areas and this is used as a crank angle storing work area (this work area is hereinafter referred to as CL). The construction of this CL is shown in FIG. 5. While the rotational speed sensor 7 generates a signal N for each 30° of crankshaft rotation as well as a signal G for each 720° of crankshaft rotation, the stage 412 monitors the state of a signal G' so that when the signal G' changes from a "LOW" to a "HIGH" state, the operation of the stage 412 sets a "1" in the bit position 0 and a "0" is set in each of the other bit positions.

Thus, if the area CL is shifted by one bit to the left each time the subroutine INT$_2$ is started two times, the corresponding engine crank angle can be easily determined in accordance with the state of the signal G (or G') and that bit position which has a "1". It is also possible to easily determine which one of the six cylinders of the engine 1 is to be subjected to the ignition control. For instance, if the signal G' rises in the positive-going direction, the area of FIG. 5 becomes (A) 00 . . . 01 and the subroutine INT$_2$ is started for each 30° crankshaft rotation, thus shifting the 37 1" position to the left in the area for each two cycles of the subroutine INT$_2$ or 60° crankshaft rotation. The area changes (B) 00 . . . 010 (0≦crank angle≦60°), (C) 00 . . . 0100 (60°≦crank angle≦180°), (D) 0 . . . 01000 (120°≦crank angle≦180°), . . . so that if the No. 2 bit is "1" as in the case of (C), the existing condition is between when the "1" bit position is the No. 1 bit and the No. 2 bit in the CL of FIG. 6, that is, the firing of the No. 1 cylinder has been completed and thus the next cylinder to be fired is the No. 5 cylinder (where the predetermined firing order is 1-5-3-6-2-4). A stage 413 determines whether the current processing of the INT$_2$ is an ignition timing processing angle. The present embodiment is applied to the six-cylinder four-cycle engine and thus the ignition timing process is effected only for each 120° of crankshaft rotation. If it is the ignition timing processing angle, the processing proceeds to a stage 414; otherwise, the control is returned to the main routine. The stage 414 monitors the condition of the IG switch 12 so that if the IG switch 12 is in the ST position indicative of the cranking operation, the processing proceeds to a stage 415 so that a fixed ignition advance process (a TDC ignition) is effected for the purpose of stabilizing the ignition control. If the IG switch 12 is not in the ST position, the processing proceeds to a stage 416.

The stage 416 determines whether the preceding ignition control was the one effected by the instruction of the main routine stage 407 or the periodic ignition retardation for the purpose of sampling the vibration level of the knock sensor 6 under the nonknocking condition (or the background vibration level). In the event that the periodic ignition retardation was effected by the preceding ignition control, the processing proceeds to a stage 417; otherwise, the processing proceeds to a stage 419.

The stage 417 samples the vibration level from the knock sensor 6 through the second A/D converter 29. The vibration level from the knock sensor 6 which was sampled by the stage 417 represents the knock sensor vibration level under the nonknocking condition or the background vibration level. A stage 418 detects a predetermined RAM point for storing the background vibration level in accordance with the cylinder subjected to the preceding ignition control and the load condition of the engine 1 (the intake air flow data, the crank angle data, etc.) and stores the background vibration level obtained by the stage 417. This background vibration level serves as a basic data for the detection of the occurrence of knocking by a stage 420 which will be described later.

The stage 419 is processed when the preceding ignition control was an ordinary ignition control other than the periodic ignition retardation and thus the vibration level from the knock sensor 6 due to the preceding ignition is sampled through the second A/D converter 29.

A stage 420 reads, in accordance with the load condition of the engine 1, the background vibration level obtained by the stage 418 from the RAM with respect to the cylinder subjected to the preceding ignition control and compares it with the vibration level of the knock sensor 6 which was obtained by the stage 419, thus detecting the presence and intensity of knocking and thereby determining a knock correction advance (hereinafter referred to as $\theta_{KNOCK}$) for the ignition timing subjected to the current ignition control so as to decrease the knocking.

A stage 421 determines whether the periodic ignition retardation for background vibration level sampling purposes is being performed under the instruction of the main routine stage 407. If the periodic ignition retardation is being performed, the processing proceeds to a stage 422; and if it is not, the processing proceeds to a stage 423.

Since the background vibration level sampling is effected for all of the six cylinders of the engine 1 by retarding the ignition timing with respect a particular one of the cylinders for each two crankshaft revolutions, the stage 422 specifies the cylinder for which the periodic ignition retardation is to be effected and memorizes the cylinder associated with the current periodic ignition retardation for the cylinder discrimination purposes in the background vibration level storing operation effected by the stage 418. Also the stage 422 determines an amount of ignition retard (hereinafter referred to as $\theta_{RETARD}$) for the periodic ignition retardation. This $\theta_{RETARD}$ represents a value necessary to retard the ignition timing from the normal ignition timing to one which positively eliminates the occurrence of knock in accordance with the operating condition of the engine 1. This value has been predetermined in correspondence with the operating condition of the engine 1 and stored in the memory.

A stage 423 determines an ignition timing for the performance of the current ignition control in accordance with the $\theta_{THW}$ computed by the main routine stage 405, the $\theta_{BASE}$ computed by the stage 406 and the $\theta_{KNOCK}$ computed by the stage 420. If the current ignition control is the execution of a periodic ignition retardation, the ignition timing is determined by additionally using the $\theta_{RETARD}$ obtained by the stage 422. In addition to the determination of the ignition timing, the stage 423 memorizes the cylinder subjected to the current ignition control and uses it for the purpose of cylinder discrimination in the knock detection by the stage 420.

A stage 424 transmits an ignition signal to the driver circuit 30 in accordance with the ignition timing determined by the stage 423 or the fixed ignition advance determined by the stage 415 if the IG switch 12 is in the ST position. After the completion of these processes, the processing of the MPU 21 is returned to the main routine.

As described hereinabove, the ignition timing control system of this invention may preferably comprise the following means.

(1) Means including a crankshaft rotational angle and cylinder discrimination sensor incorporated in the distributor to determine an ignition timing for each of the engine cylinders.

(2) Means responsive to the means of the above (1) so that at intervals of a predetermined period which does not deteriorate the power performance of the engine, the ignition timing is retarded to such an extent that the occurrence of knocking is positively prevented and the resulting vibration level (the background vibration level) of the knock sensor 6 is sampled and the background vibration level is stored for each of the load conditions which are dependent on the operating conditions of the engine 1.

(3) Means for comparing the background vibration level obtained by the above (2) with the vibration level of the knock sensor 6 under the normal operation using the then current load condition as a parameter.

It will be seen that the provision of the means in the above (1), (2) and (3) provides an ignition timing control system which features detecting the presence and intensity of knocking in accordance with the vibration level of the knock sensor 6, accurately determining an ignition timing for each engine cylinder in accordance with each engine load condition and preventing the occurrence of knocking.

We claim:

1. An ignition timing control system for controlling the ignition timing of an internal combustion engine having a plurality of combustion cylinders, said system comprising:

sensing means for producing a vibration level signal dependent upon the vibration produced by said engine;

retarding means for periodically retarding said ignition timing of said engine for each of said cylinders to avoid occurrence of engine knock;

sampling means for sampling a plurality of vibration level signals of said sensing means when said ignition timing is retarded, each of said plurality of sampled signals being dependent upon said vibration produced by said engine when a different one of said cylinders fires, for storing said plurality of samples signals, and for sampling the vibration level signal provided by said sensing means when each of said cylinders fires when said ignition timing is not retarded;

comparing means for comparing said sampled signal sampled when said ignition timing is not retarded wth one of said stored sampled plurality of signals corresponding to said firing cylinder to detect the magnitude of engine knock produced by said cylinder; and timing means responsive to said comparing means for independently adjusting said ignition timing for each of said cylinders when said ignition timing is not retarded to eliminate engine knock having a magnitude above a predetermined level.

2. An ignition timing control system for controlling the ignition timing of an internal combustion engine having a plurality of combustion cylinders, said system comprising:

sensing means for generating a vibration level signal dependent upon the vibration produced by said engine;

ignition means for firing said cylinders in a predetermined order;

detecting means for detecting at least one operating condition of said engine;

discriminating means for discriminating which cylinder of said engine is being fired by said ignition means;

retarding means for periodically retarding the time at which said ignition means fires each of said cylinders to prevent the occurrence of engine knock;

sampling means for sampling a plurality of vibration level signals of said sensing means when said firing time is retarded by said retarding means, each of said plurality of sampled signals being dependent upon the vibration produced by said engine when one of said cylinders fires, and for storing said plurality of said sampled signals together with said detected operating condition;

optimizing means for computing a plurality of optimum ignition timing angles, said plurality of timing angles including timing angles for each of said cylinders for a plurality of said detected operating conditions, said optimizing means including:

discriminating means for discriminating when said ignition timing is retarded;

recall means for recalling at least one of said stored sampled signals; and comparing means for comparing said recalled stored signal with said vibration level signal generated by said sensing means when said ignition timing is not retarded to generate a knocking correction signal; and control means responsive to said knocking correction signal for controlling said ignition means to eliminate said engine knock in each of said cylinders having a magnitude above a predetermined level.

3. An ignition timing control system for controlling the ignition timing of an internal combustion engine having a plurality of cylinders, said system comprising:

intake air flow sensing means for sensing the volume of air flowing into said engine;

rotational speed sensing means for sensing the rotational speed of said engine;

knock sensing means for generating a vibration level signal dependent upon the vibration produced by said engine;

a plurality of firing means, one of said firing means provided for each of said plurality of cylinders of said engine, for firing said cylinders;

ignition means for individually actuating said plurality of firing means in a predetermined sequence; and microcomputer means, comprising an MPU and input and output circuits, for:

(1) fetching a plurality of engine operating condition signals including signals produced by said intake air flow sensing means and said rotational speed sensing means;

(2) generating a basic ignition timing angle dependent upon said fetched operating condition signals;

(3) periodically computing a plurality of retarded ignition timing angles, one for each of said cylinders, from said fetched operating condition signals for controlling said ignition means so that engine knock does not occur;

(4) periodically controlling said ignition means to actuate each of said plurality of firing means at said computed retarded ignition timing angles;

(5) controlling said ignition means to actuate said plurality of firing means according to said basic ignition timing angle whenever said ignition means is not actuating said plurality of firing means at said retarded ignition timing angles;

(6) determining whether a predetermined firing of a predetermined one of said cylinders was actuated at said computed retarded ignition timing angle or at said basic ignition timing angle;

(7) sampling said vibration level signal of said knock sensing means;

(8) storing said sampled level signal together with said fetched operating condition signals if said predetermined firing was actuated at said retarded ignition timing angle;

(9) recalling said stored signal for said predetermined one of said cylinders corresponding to said fetched operating condition signals if said predetermined firing was actuated at said basic ignition timing angle;

(10) comparing said recalled stored signal with said sampled signals and generating a knock correction signal;

(11) determining which of said plurality of firing means is next to be actuated by said ignition means;

(12) computing said retarded ignition timing angle from said basic ignition timing angle for said cylinder provided with said firing means next to be actuated if said firing means next to be actuated will be actuated at said retarded ignition timing angle;

(13) updating said basic ignition timing angle and said knock correction signal for said cylinder provided with said firing means next to be actuated if said firing means next to be actuated will be actuated at said basic ignition timing angle.

4. An ignition timing control system for controlling ignition timing of an internal combustion engine, comprising:

sensing means for sensing mechanical vibrations produced by said engine;

retarding means for periodically retarding said ignition timing of said engine from a basic ignition timing angle to a predetermined ignition timing angle whereat engine knock does not occur;

comparing means responsive to said sensing means for comparing said mechanical vibrations produced by said engine when said ignition timing is at said basic ignition timing angle with said mechanical vibrations produced by said engine when said ignition timing is retarded to determine the presence of engine knock when said ignition timing is at said basic ignition timing angle; and control means responsive to said comparing means for changing said basic ignition timing angle to reduce engine knock to below a predetermined level.

5. A system according to claim 1, wherein said detecting means detects a plurality of operating conditions, including water temperature and intake air flow and further comprising: water temperature sensor means for detecting a cooling water temperature to generate a water temperature indicative signal; intake air flow sensor means for detecting an intake air flow to generate an air flow signal; multiplexer means for selecting between said water temperature indicative signal and said air flow signal; timer means for periodically introducing said vibration level signal to said sampling means and said signal selected by said multiplexer to said detecting means; and A/D converter means for subjecting said water temperature indicative, air flow and vibration level signals to A/D conversion before said signals are introduced to said detecting means and to said sampling means, respectively.

6. An ignition timing control system as in claim 4 further comprising:

storing means for storing the level of said sensed mechanical vibrations produced by said engine when said ignition timing is retarded; and wherein said comparing means compares said stored level with the level of said mechanical vibrations produced by said engine when said ignition timing is at said basic ignition timing angle.

7. An ignition timing control system as in claim 4 wherein:

said engine has a plurality of combustion cylinders; and said apparatus controls the ignition timing of each of said cylinders independently according to an independent basic ignition timing angle and predetermined ignition timing angle for each of said cylinders.

8. An ignition timing control circuit as in claim 7 further comprising:

storing means for storing the level of a plurality of said sensed mechanical vibrations produced by said engine when said ignition timing is retarded, one associated with each of said cylinders; and wherein said comparing means compares the one of said stored levels associated with a predetermined cylinder with the level of said mechanical vibrations produced by said engine when said predetermined cylinder fires and said ignition timing is at said basic ignition timing angle for said cylinder.

9. A method of controlling the ignition timing of an internal combustion engine comprising the steps of:

sensing mechanical vibrations produced by said engine;

periodically retarding the ignition timing of said engine from a basic ignition timing angle to a fixed predetermined ignition timing angle wherein engine knock does not occur;

comparing said sensed mechanical vibrations when said ignition timing is at said basic ignition timing angle with said sensed mechanical vibrations produced when said ignition timing is retarded to determine the presence of engine knock when said ignition timing is at said basic ignition timing angle; and changing said basic ignition timing angle to reduce engine knock below a predetermined level.

10. A method of controlling the ignition timing of an internal combustion engine comprising the steps of:

sensing mechanical vibrations produced by said engine;

periodically retarding the ignition timing of said engine from a basic ignition timing angle to a predetermined ignition timing angle wherein engine knock does not occur;

comparing said sensed mechanical vibrations when said ignition timing is at said basic ignition timing angle with said sensed mechanical vibrations produced when said ignition timing is retarded to determine the presence of engine knock when said ignition timing is at said basic ignition timing angle; and changing said basic ignition timing angle to reduce engine knock to below a predetermined level, and wherein said internal combustion engine has a plurality of cylinders and wherein said sensing step, said retarding step, said comparting step and said changing step are repeated independently for each of said cylinders.

11. A method of controlling the ignition timing of an internal combustion engine comprising the steps of:

sensing mechanical vibrations produced by said engine;

periodically retarding the ignition timing of said engine from a basic ignition timing angle to a predetermined ignition timing angle wherein engine knock does not occur;

comparing said sensed mechanical vibrations when said ignition timing is at said basic ignition timing angle with said sensed mechanical vibrations produced when said ignition timing is retarded to determine the presence of engine knock when said ignition timing is at said basic ignition timing angle;

changing said basic ignition timing angle to reduce engine knock to below a predetermined level, and storing the level of said sensed mechanical vibrations produced by engine when said ignition timing is retarded; and wherein said comparing step compares said stored level of said storing step with the level of said mechanical vibrations produced by said engine when said ignition timing is at said basic ignition timing angle.

* * * * *